(12) United States Patent
Ohta et al.

(10) Patent No.: US 8,186,003 B2
(45) Date of Patent: May 29, 2012

(54) WIPER STRIP, WIPER BLADE AND DESIGNING METHOD OF WIPER STRIP

(75) Inventors: Isao Ohta, Hamana-gun (JP); Masaaki Kiyama, Hamamatsu (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 774 days.

(21) Appl. No.: 12/149,194

(22) Filed: Apr. 29, 2008

(65) Prior Publication Data
US 2008/0289136 A1  Nov. 27, 2008

(30) Foreign Application Priority Data
May 23, 2007  (JP) .................. 2007-137056

(51) Int. Cl.
B60S 1/02 (2006.01)
(52) U.S. Cl. ........... 15/250.361; 15/250.43; 15/250.451; 15/250.48
(58) Field of Classification Search ............ 15/201, 15/361, 250.201, 250.361, 250.43, 250.451, 15/250.48
See application file for complete search history.

(56) References Cited

U.S. PATENT DOCUMENTS

| | | | | |
|---|---|---|---|---|
| 4,807,326 A * | 2/1989 | Arai et al. | ............. | 15/250.43 |
| 6,281,649 B1 * | 8/2001 | Ouellette et al. | ............. | 318/443 |
| 6,288,509 B1 * | 9/2001 | Amagasa | ............. | 318/443 |
| 6,836,926 B1 * | 1/2005 | De Block | ............. | 15/250.43 |
| 6,874,195 B2 * | 4/2005 | Kotlarski et al. | ............. | 15/250.201 |
| 7,338,148 B2 * | 3/2008 | Ono | ............. | 347/45 |
| 7,555,806 B1 * | 7/2009 | James | ............. | 15/250.41 |

FOREIGN PATENT DOCUMENTS

| | | |
|---|---|---|
| JP | U-S63-98266 | 6/1988 |
| JP | A-05-301562 | 11/1993 |
| JP | A-H6-135300 | 5/1994 |
| JP | A-H7-246916 | 9/1995 |

OTHER PUBLICATIONS

Office Action issued on Apr. 25, 2011 issued in the corresponding Chinese Patent Application No. 2008-10109156.8 (English translation enclosed).
L. Sheng et al., "Reynolds Equation" pp. 147-157 (Aug. 1996) (English translation enclosed).
Office Action mailed Nov. 22, 2011 in corresponding JP Application No. 2007-137056 (and English Translation).

* cited by examiner

*Primary Examiner* — Monica Carter
*Assistant Examiner* — Michael Jennings
(74) *Attorney, Agent, or Firm* — Posz Law Group, PLC

(57) ABSTRACT

A relationship between a thickness of a water film at a location of a maximum pressing pressure and a maximum pressure gradient value is deduced. Each corresponding design factor of a wiper blade is determined based on this relationship, and the wiper blade is manufactured. In this way, at the wiper blade, a thickness of the water film right after wiping falls in an appropriate range.

9 Claims, 6 Drawing Sheets

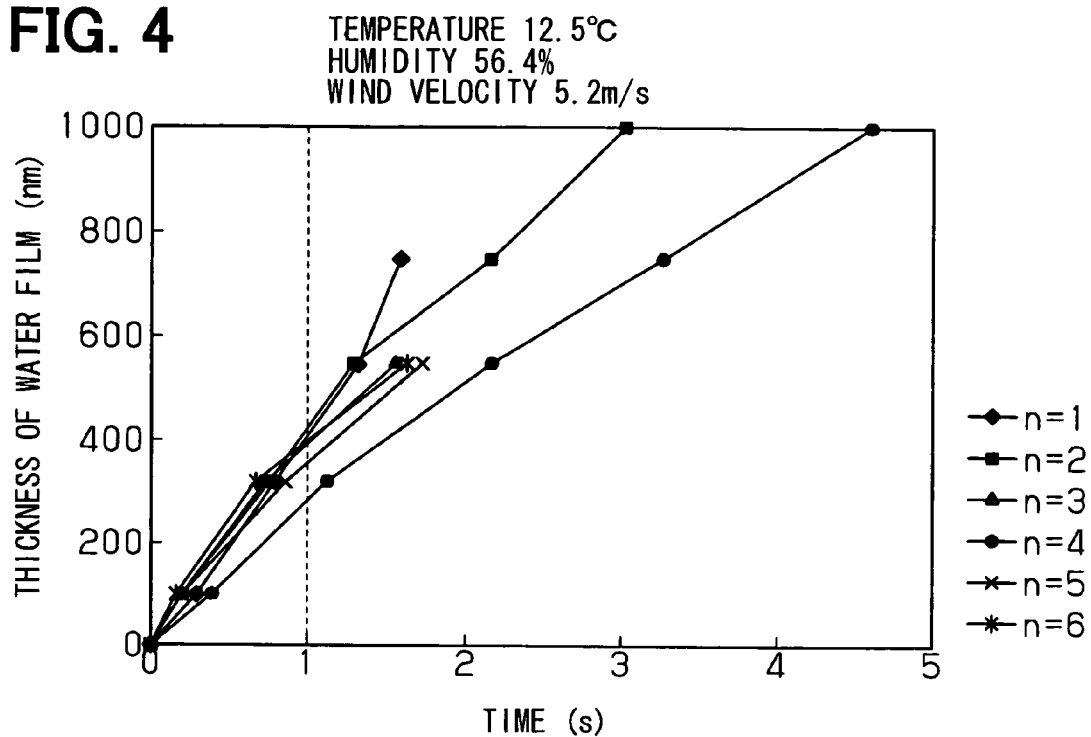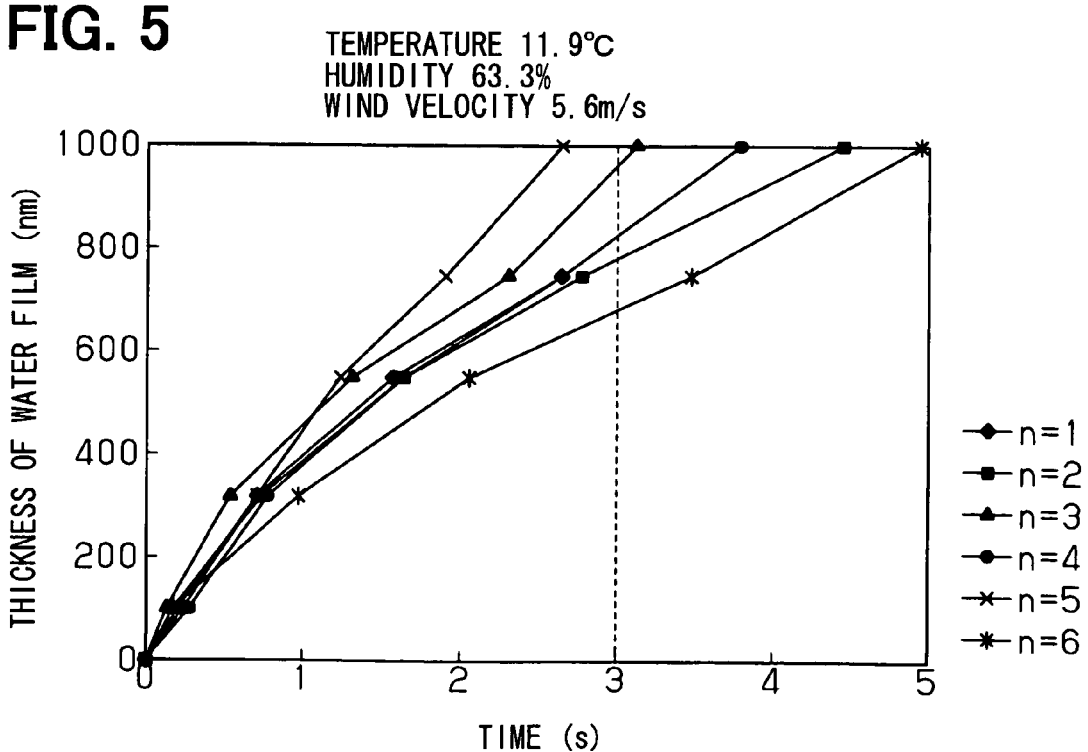

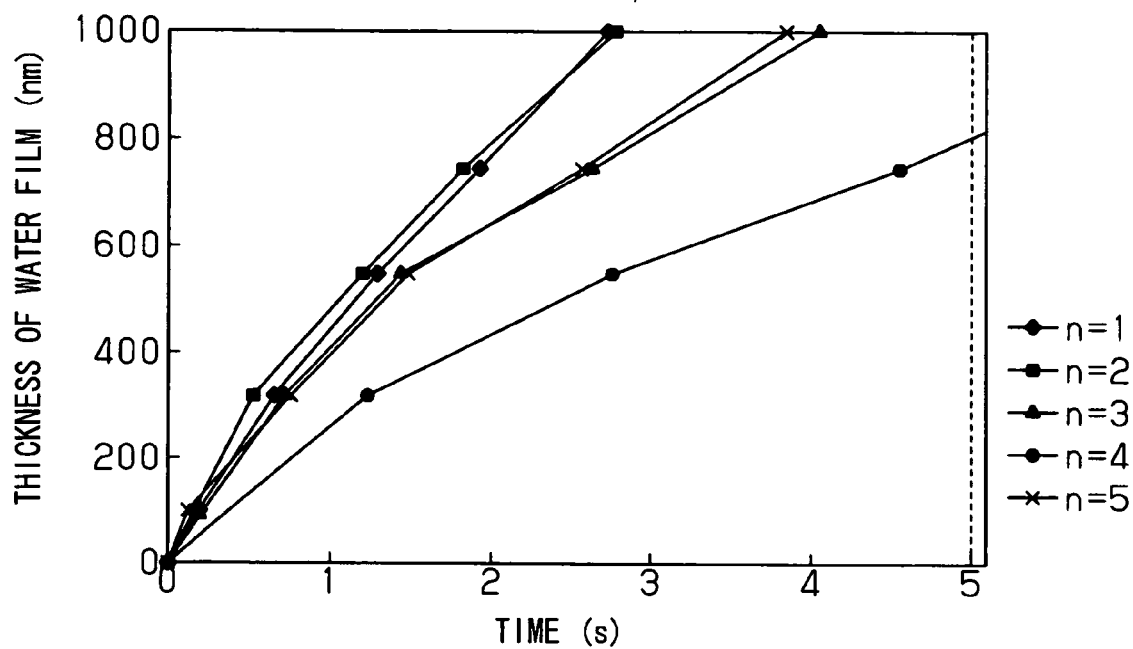
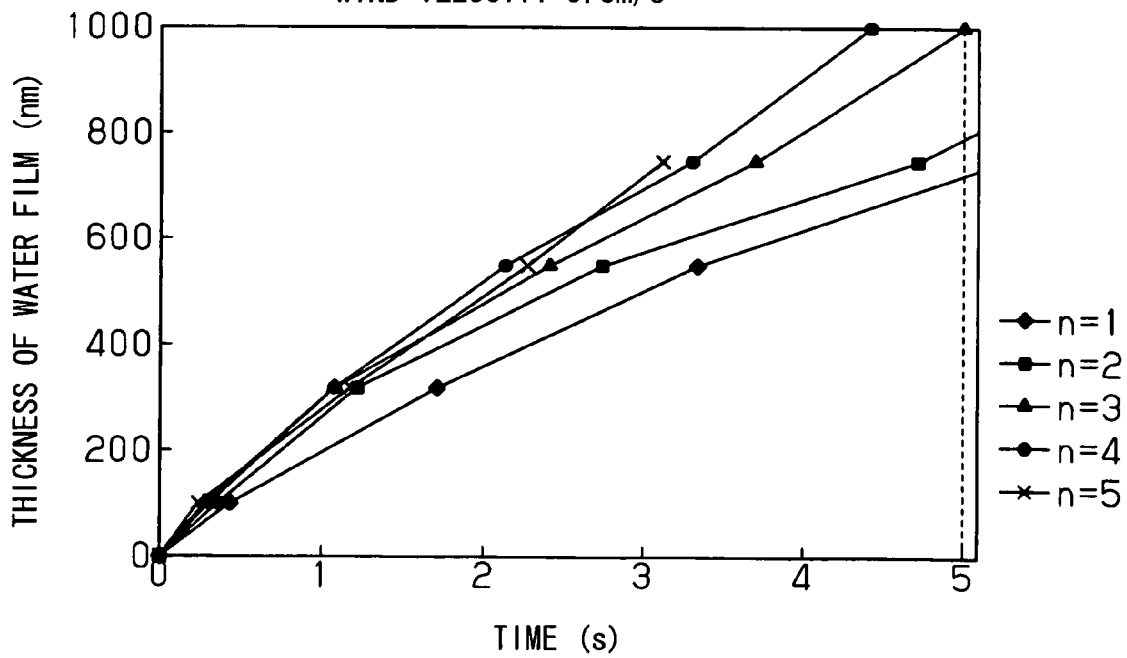

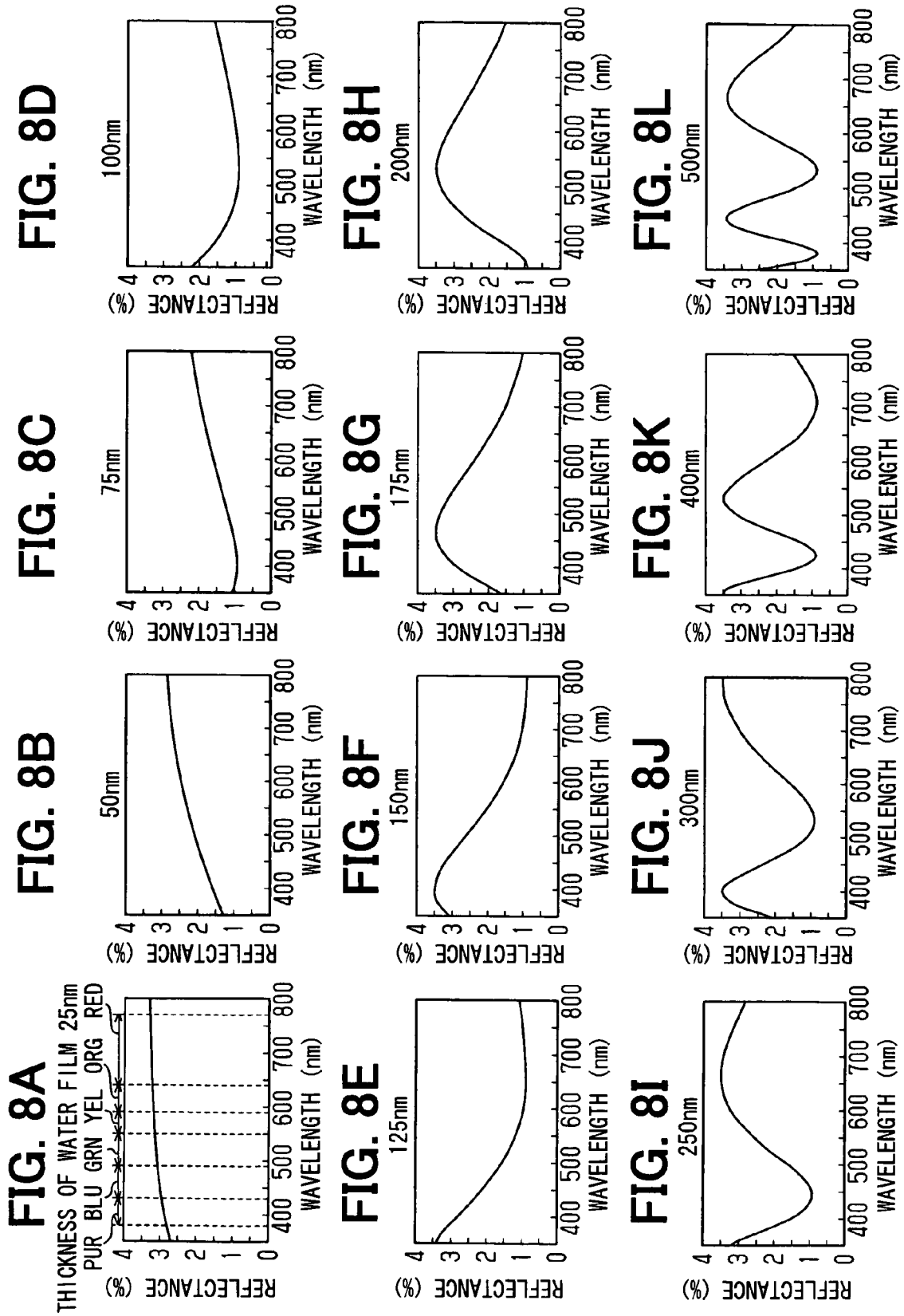

WIPER STRIP, WIPER BLADE AND DESIGNING METHOD OF WIPER STRIP

CROSS REFERENCE TO RELATED APPLICATION

This application is based on and incorporates herein by reference Japanese Patent Application No. 2007-137056 filed on May 23, 2007.

BACKGROUND OF THE INVENTION

1. Field of the Invention

The present invention relates to a wiper strip, a wiper blade having the wiper strip and a designing method of the wiper strip.

2. Description of Related Art

A wiper strip of a vehicle wiper wipes water droplets, which adhere to a glass surface, so that a thin and generally uniform water film is formed by the wiper right after the wiping on the glass surface right after the wiping. As a result, refraction and diffuse reflection of the light at the water film right after the wiping are reduced, thereby resulting in an improved wiping performance. For example, according to the technique recited in Japanese Unexamined Patent Publication No. H07-246916, a contact angle of a wiper strip of the wiper (an angle defined between a lip portion of the wiper strip and the glass surface) is appropriately set to improve the wiping performance.

However, the appropriate setting of the contact angle for improving the wiping performance has been already standardized, and it has been demanded to further improve the wiping performance. In order to meet such a demand, designers of the wiper strip have tried to find appropriate design factors (e.g., a material of the wiper strip, shapes and sizes of corresponding parts of the wiper strip) based on experience and wisdom of the designers and have produced prototypes of the wiper strip and have tested the same. However, it has not been clear for the designers which one or more of the design factors actually contribute to the improvement of the wiping performance in what way. Thus, it has been difficult to obtain a wiper strip having a higher performance. Therefore, although the contact angle of the wiper strip is appropriately set, the material of the wiper strip and the shapes and sizes of the corresponding parts of the wiper strip are still conventional ones.

SUMMARY OF THE INVENTION

The present invention addresses the above disadvantages. Thus, it is an objective of the present invention to provide a wiper strip having an improved performance, a wiper blade having such a wiper strip and a designing method of such a wiper strip.

To achieve the objective of the present invention, there is provided a wiper strip that includes a contacting portion, which is engageable with a wiping surface through a liquid film. A maximum pressure gradient value of a pressing pressure profile at the contacting portion against the wiping surface may be set to fall in a first range, which is equal to or larger than 44.1 MPa/mm. Alternatively, the maximum pressure gradient value of the pressing pressure profile at the contacting portion against the wiping surface may be set to fall in a second range, which is equal to or larger than 88.5 MPa/mm. Further alternatively, the maximum pressure gradient value of the pressing pressure profile at the contacting portion against the wiping surface may be set to fall in a third range, which is equal to or larger than 509.7 MPa/mm. Furthermore, there may be provided a wiper blade that includes the above wiper strip.

Also, there is provided a designing method of a wiper strip. According to the design method, each corresponding design factor of the wiper strip, which includes a contacting portion that is engageable with a wiping surface through a liquid film, is determined based on a relationship between a maximum pressure gradient value of a pressing pressure profile at the contacting portion against the wiping surface and a thickness of the liquid film at a location of a maximum pressing pressure. The above relationship is expressed by the following equation:

$$\left(\frac{dP}{dx}\right)_{max} = \frac{8}{9} \cdot \frac{\eta \cdot U}{h_m^2}$$

where $$\left(\frac{dP}{dx}\right)_{max}$$

denotes the maximum pressure gradient value;
"$h_m$" denotes the thickness of the liquid film at the location of the maximum pressing pressure of the contacting portion;
"$\eta$" denotes a coefficient of viscosity of the liquid; and
"$U$" denotes a moving speed of the wiper strip.

BRIEF DESCRIPTION OF THE DRAWINGS

The invention, together with additional objectives, features and advantages thereof, will be best understood from the following description, the appended claims and the accompanying drawings in which:

FIG. 4 is a diagram showing a relationship between a thickness of a water film and a time period required for evaporation of the same in a specific condition;

FIG. 5 is a diagram showing a relationship between a thickness of a water film and a time period required for evaporation of the same in another specific condition;

FIG. 6 is a diagram showing a relationship between a thickness of a water film and a time period required for evaporation of the same in a further specific condition;

FIG. 7 is a diagram showing a relationship between a thickness of a water film and a time period required for evaporation of the same in another specific condition; and FIGS. 8A to 8L are diagrams showing a relationship between a reflectance of a reflected light and a wavelength of a visible light range of the reflected light for various thicknesses of the water film.

DETAILED DESCRIPTION OF THE INVENTION

An embodiment of the present invention will be described with reference to the accompanying drawings.

Figure 1:
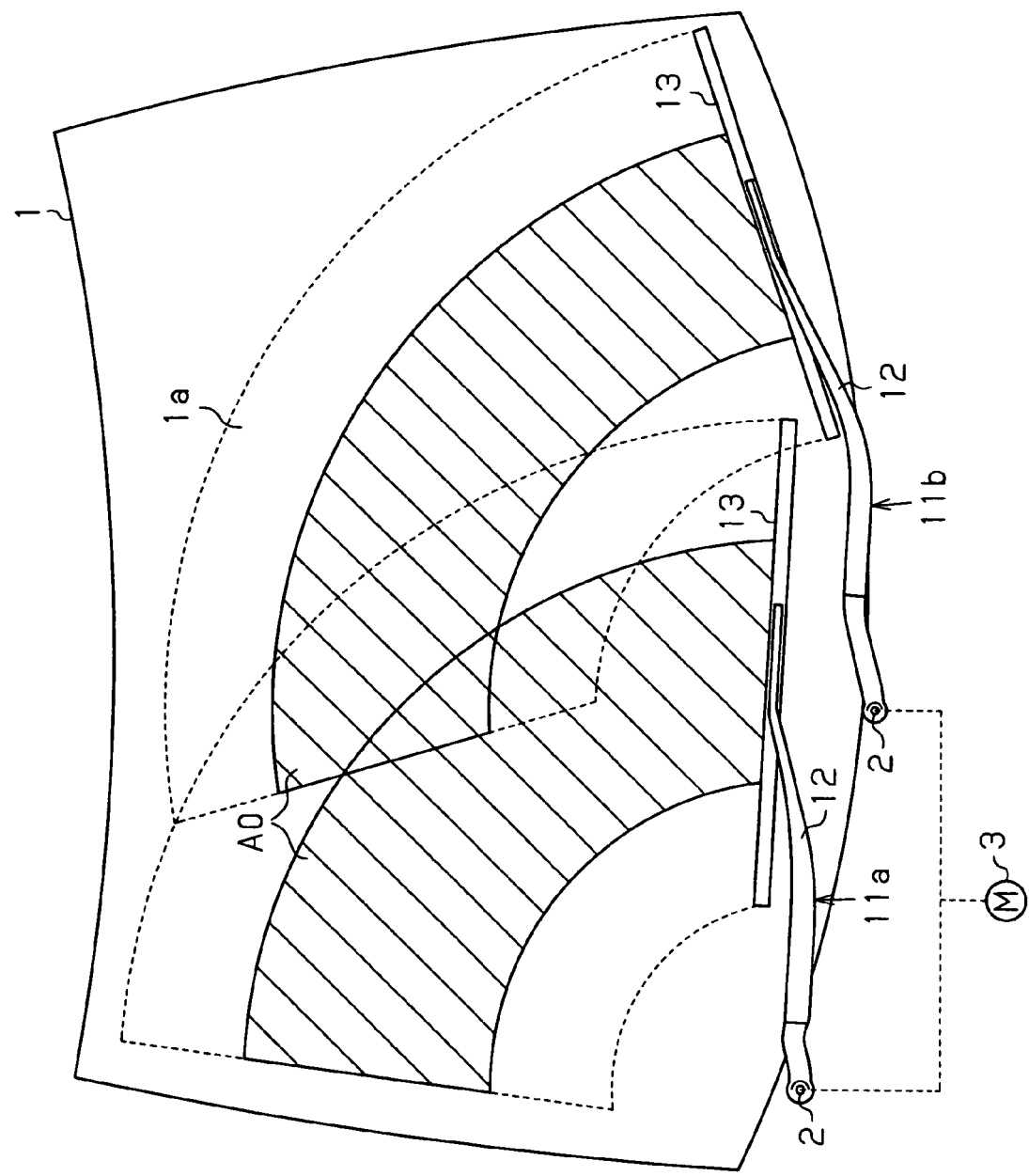
FIG. 1 is a schematic diagram showing a wiper according to an embodiment of the present invention.

FIG. 1 shows two vehicle wipers 11a, 11b, each of which wipes rain water (liquid) on a glass surface (a wiping surface) 1a of a front glass (a windshield) 1 of a vehicle. Each wiper 11a, 11b includes a wiper arm 12 and a wiper blade 13. A base end portion of the wiper arm 12 is fixed to a corresponding pivot shaft 2. The wiper blade 13 is pivotably connected to a distal end portion of the wiper arm 12 to pivot along the glass surface 1a in conformity with a curved configuration of the glass surface 1a. A spring (not shown) is installed in each wiper arm 12 to exert an urging force for urging the wiper blade 13 against the glass surface 1a. When the pivot shaft 2 is reciprocally pivoted by a drive force of a wiper motor 3, the wiper arm 12 is reciprocally swung, so that the wiper blade 13 performs a reciprocal wiping movement to wipe the glass surface 1a.

Figure 2:
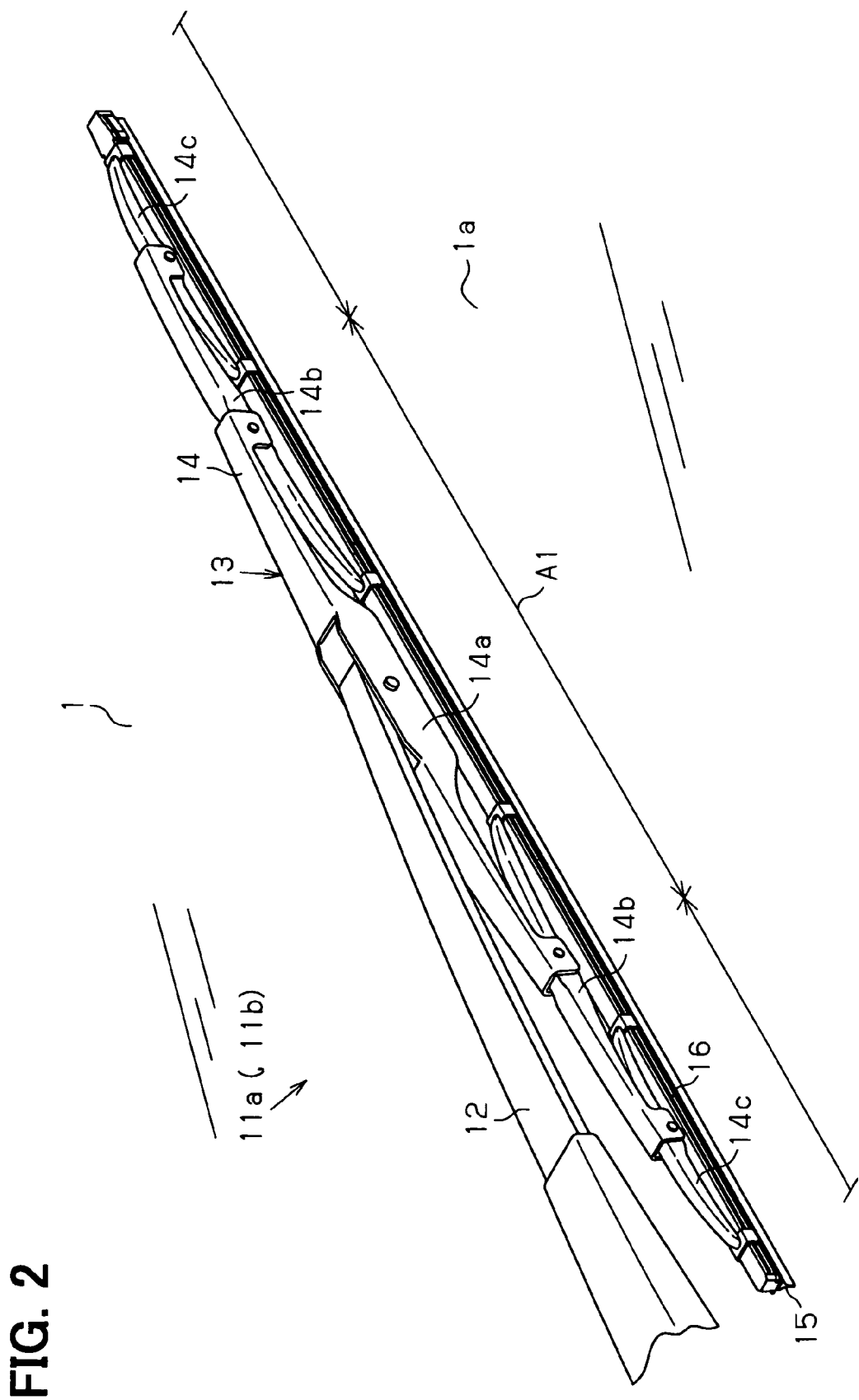
FIG. 2 is an enlarged perspective view showing a structure of the wiper of FIG. 1.

In the wiper blade 13, as shown in FIG. 2, an elongated wiper strip 15, which is made of an elastic material (elastomer such as rubber or resilient resin), is supported by a lever member 14 that is connected to the wiper arm 12. The lever member 14 includes a plurality of levers 14a-14c, which are connected to one another in a tournament style. The wiper strip 15, which is held by the lever member 14, holds backings 16 along a length thereof. Each backing 16 is made of a leaf spring member. The urging force of the wiper arm 12 toward the glass surface 1a is applied to the lever member 14 and is spread along the length of the wiper strip 15 by the backings 16, so that the wiper strip 15 contacts the glass surface 1a.

Figure 3A:
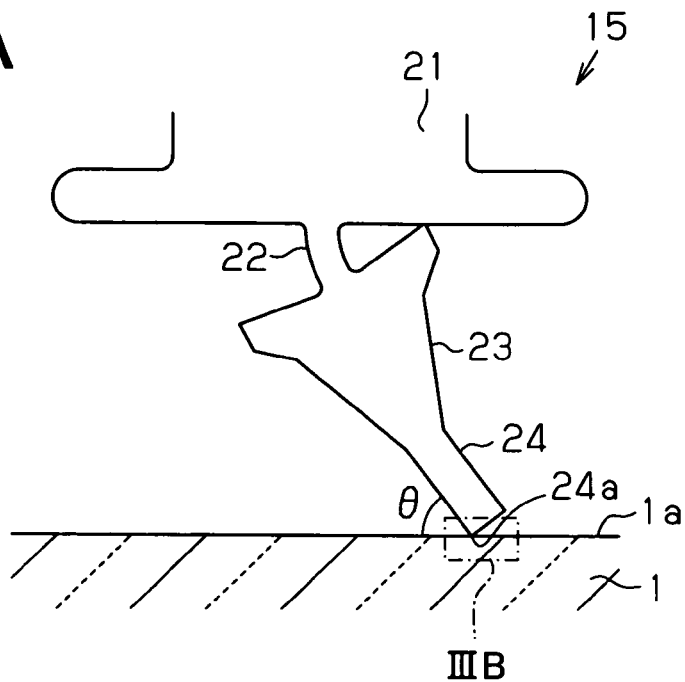
FIG. 3A is a schematic diagram showing an wiping operation of the wiper strip of the wiper of FIGS. 1 and 2 according to the embodiment.
Figure 3B:
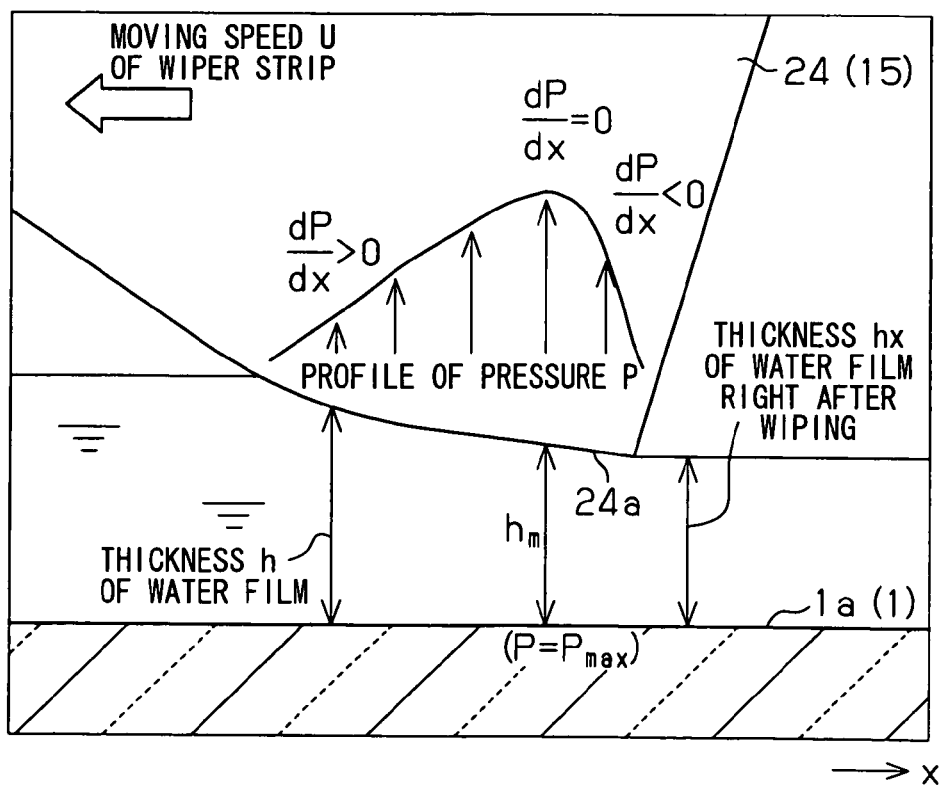
FIG. 3B is an enlarged view showing an area IIIB in FIG. 3A.

As shown in FIGS. 3A and 3B, each of which provides a view in the longitudinal direction, the wiper strip 15 includes a base portion 21 and a wiping portion 23. The base portion 21 is held by the lever member 14. The wiping portion 23 has an inverted triangular shape and is connected to a lower surface of the base portion 21 through a neck portion 22. A lip portion 24, which has a generally constant width along a length thereof, is formed at a lower end of the wiping portion 23. The wiper strip 15 wipes the glass surface 1a through the lip portion 24. In the present embodiment, the wiping portion 23 and a surrounding area thereof are formed to implement an appropriate contact angle θ of the lip portion 24 (e.g., 35 to 55 degrees) and thereby to improve the wiping performance of the wiper blade 13.

In addition, it has been found that the wiping performance of the wiper blade 13 is fairly good in a case where a thickness hx of a water film (a liquid film) on the glass surface right after the wiping is in a range of 0 nm<hx≦425 nm. This is found through the test conducted pursuant to Japanese Industrial Standard (JIS) D5710 (Automotive parts—Wiper arms and wiper blades).

According to the wiping performance test defined in JIS D5710, a test environment should be kept under the ambient temperature of 20±15 degrees Celsius, and a glass surface should be wiped with the wiper after spraying of water mist over the glass surface. Then, visual determination of remains (visual determination of the number of remaining streaks on the glass surface after the wiping) should be carried out after 1 second in a case of humidity less than 60%, after 3 seconds in a case of humidity equal to or higher than 60% but less than 70%, and after 5 seconds in a case of humidity equal to or higher than 70%. Furthermore, this wiping performance test should be carried out without applying a direct wind to the glass surface.

The inventors of the present application have conducted the wiping performance test similar to the one defined in JIS D5710. Here, the ambient temperature is kept within the above temperature range throughout the test, and the test is performed for each of the above humidity ranges. For each of the above humidity ranges, there is measured a thickness of a water film, which is completely evaporated after the elapse of the corresponding predetermined time period set for the particular humidity range. Although this test is conducted under the more severe standard in comparison to the above-described JIS D5710, this test improves the reliability of the test result in comparison to JIS D5710 where the number of remaining streaks is counted. Furthermore, the above-described JIS D5710 prohibits the direct application of wind to the glass surface. In contrast, in the test carried out by the inventors of the present application, the wind, which has a wind velocity of 5.2 to 5.6 m/s, is applied to the glass surface to execute the test in the more realistic condition and thereby to assess the influence on the visibility of a vehicle driver during traveling of the vehicle. The wind velocity of 5.2 to 5.6 m/s corresponds to the headwind applied to the glass surface upon traveling of the vehicle at about 20 km/h. FIGS. 4 to 7 show the result of the test. At the time of measurement, the ambient temperature was kept around 12 degrees Celsius.

FIG. 4 shows the result of the measurement of the relationship between the thickness of the completely evaporated water film and the time required for the complete evaporation thereof after the wiping under the condition of the temperature of 12.5 degrees Celsius, the humidity of 56.4% and the wind velocity of 5.2 m/s. Under this condition, the measurement is made six times (n=1 to 6). Under this humidity condition, the determination is made after 1 second since the time of wiping. The test result reveals that the thickness of the water film, which can be completely evaporated after 1 second since the time of wiping, is at least about 300 nm.

FIG. 5 shows the result of the measurement of the relationship between the thickness of the completely evaporated water film and the time required for the complete evaporation thereof after the wiping under the condition of the temperature of 11.9 degrees Celsius, the humidity of 63.3% and the wind velocity of 5.6 m/s. Under this condition, the measurement is made six times (n=1 to 6). Under this humidity condition, the determination is made after 3 seconds since the time of wiping. The test result reveals that the thickness of the water film, which can be completely evaporated after 3 seconds since the time of wiping, is at least about 650 nm.

FIG. 6 shows the result of the measurement of the relationship between the thickness of the completely evaporated water film and the time required for the complete evaporation thereof after the wiping under the condition of the temperature of 12.0 degrees Celsius, the humidity of 72.0% and the wind velocity of 5.2 m/s. Under this condition, the measurement is made five times (n=1 to 5). Under this humidity condition, the determination is made after 5 seconds since the time of wiping. The test result reveals that the thickness of the water film, which can be completely evaporated after 5 seconds since the time of wiping, is at least about 800 nm.

FIG. 7 shows the result of the measurement of the relationship between the thickness of the completely evaporated water film and the time required for the complete evaporation thereof after the wiping under the condition of the temperature of 11.6 degrees Celsius, the humidity of 83.0% and the wind velocity of 5.3 m/s. This humidity condition is more severe in comparison to that of JIS D5710. Under this condition, the measurement is also made five times (n=1 to 5). Under this humidity condition, the determination is made after 5 seconds since the time of wiping. The test result reveals that the thickness of the water film, which can be completely evaporated after 5 seconds since the time of wiping, is at least about 700 nm.

In sum, according to the test, which is carried out by the inventors of the present application in the manner similar to that of JIS D5710, the determination, which is made after 1 second since the time of wiping under the condition of the humidity of 56.4% shown in FIG. 4, i.e., the humidity of less than 60%, is the most severe determination among the determinations made under the above conditions, respectively. Even in this most severe determination, it is found that when the thickness of the water film right after the wiping is equal to or less than 300 nm, the water film can be completely evaporated after 1 second. Accordingly, it is found that the thickness hx of the water film in the range of 0 nm<hx≦300 nm is the suitable range for achieving the high wiping performance. The reason why the thickness of 0 nm is excluded from the above suitable range is as follows. That is, the water, which is present between the glass surface 1a and a contacting portion 24a of the wiper strip 15, can serve as a liquid lubricant. Therefore, as long as the water remains between the glass surface 1a and the contacting portion 24a, it is possible to limit wearing of the wiper strip 15 caused by the wiping, and it is possible to implement the smooth wiping movement of the wiper strip 15 over the glass surface 1a.

Furthermore, the inventors of the present application have focused on the reflection of the iridescent color(s) from the glass surface right after the wiping like the iridescent color(s) reflected from an oil film. This reflection of the iridescent color(s) from the glass surface right after the wiping is considered as a non-desirable state of the wiping performance. The iridescent color(s) on the glass surface is caused by strengthening of a specific wavelength(s) of the reflected light due to occurrence of interference of the light that depends on the thickness of the water film. In view of the above point, the inventors of the present application have studied the relationship between the thickness of the water film and the visible wavelengths of the reflected light from the water film, as shown in FIGS. 8A to 8L. In FIGS. 8A to 8L, the thickness of the water film is set at 25 nm intervals in a range of 25 nm to 200 nm (FIGS. 8A to 8H). In a range of equal to or larger than 200 nm, the thickness of the water film is set at 250 nm, 300 nm, 400 nm and 500 nm (FIGS. 8I to 8L).

At this time, in a case where a change in the reflectance with respect to the wavelength locally shows a steep trough and a steep crest, a difference between a peak value of the reflectance at the crest and a value of the reflectance before or after the peak value becomes large. Therefore, the light of the wavelength(s) around the peak value is relatively strengthened to create the iridescent color(s). Therefore, visible iridescent color(s) appears in the thickness range of 150 nm to 500 nm of the water film. For example, purple color (PUR) appears at the film thickness of 150 nm, and blue color (BLU) appears at the film thickness of 175 nm. Thus, when the thickness of the water film is equal to or larger than 150 nm, the wiping performance (wiping result) may possibly be deteriorated due to the visible iridescent color(s).

In contrast, when the thickness of the water film is equal to or less than 125 nm, the change in the reflectance is moderate, so that the water film becomes generally colorless with no strong iridescent color. As a result, the good wiping performance can be achieved even though the water film is present on the glass surface. Therefore, in view of the iridescent color(s) generated by the interference of the light, when the thickness hx of the water film right after the wiping is in the range of 0 nm<hx≦125 nm, the iridescent color(s) is not strengthened. As a result, good wiping performance (good wiping result) can be achieved right after the wiping. In view of the evaporation of the water film discussed above, it is understood that the water film having the thickness of at least 300 nm can be evaporated within the predetermined time period described above. Therefore, in the case where the thickness hx of the remaining water film right after the wiping is in the range of 0 nm<hx≦425 nm, even when the water film is left without being completely evaporated within the predetermined time period after the wiping, the remaining water film does not show the strengthened iridescent color(s). As a result, the inventors of the present application have concluded that the good wiping performance can be achieved within the range of 0 nm<hx≦425 nm.

Then, the inventors of the present application have found that the thickness hx of the water film right after the wiping can be controlled by appropriately adjusting a profile of a pressing pressure P of the lip portion 24 (more specifically, the contacting portion 24a) in the wiping direction of the wiper strip 15 (see FIG. 3). In view of the need for wiping the water, which adheres to the glass surface 1a, by the wiper strip 15 without completely removing the water, the wiping phenomenon can be regarded as the liquid lubrication of the wiper strip 15 by the water on the glass surface 1a. In view of this, the inventors of the present application have gotten an idea of applying the following fundamental equation of the hydrodynamic lubrication (the fundamental equation of Reynolds). In the following description, pages 90 to 94 of a book titled "Introduction to Tribology, Fundamentals of Friction, Wear and Lubrication" (Saiwai Shobo Co., Ltd.) will be referred to as a reference 1, and pages 144 to 148 of a book titled "Tribology" (Rikogakusha Publishing Co., Ltd.) will be referred to as a reference 2.

The following equation (1) is the fundamental equation of the hydrodynamic lubrication (the fundamental equation of Reynolds, see the reference 1). First, a relationship between the maximum pressure gradient value (dP/dx)max in the profile of the pressing pressure P and the thickness hm of the water film at the location of the maximum pressing pressure will be described.

$$\left(\frac{dP}{dx}\right) = 6\eta U\left(\frac{1}{h^2} - \frac{h_m}{h^3}\right) \quad \text{Equation (1)}$$

where "h" denotes the thickness of the water film (liquid film);

"hm" denotes the thickness of the water film at the location of $$\frac{dP}{dx} = 0,$$

i. e., the thickness of the water film at the location of the maximum pressing pressure of the contacting portion;

"P" denotes the pressing pressure of the contacting portion;

"x" denotes the location;

"η" denotes the coefficient of viscosity of the water (liquid); and

"U" denotes the moving speed (wiping speed) of the wiper strip.

Next, nondimensional variables H, S are defined by the equations (2) and (3) as follows, and the above equation (1) is non-dimensionalized (see the reference 2).

$$H = h\sqrt{\frac{\left(\frac{dP}{dx}\right)_{max}}{6\eta U}} \quad \text{Equation (2)}$$

-continued $$S = \frac{\frac{dP}{dx}}{\left(\frac{dP}{dx}\right)_{max}} \quad \text{Equation (3)}$$

where $$\left(\frac{dP}{dx}\right)_{max}$$

denotes the maximum value of $$\frac{dP}{dx}.$$

When the nondimensional variables H, S are applied to the equation (1), the following equation (4) is obtained.

$$S = \left(\frac{1}{H^2} - \frac{H_m}{H^3}\right) \text{ where } H_m = h_m \sqrt{\frac{\left(\frac{dP}{dx}\right)_{max}}{6\eta U}} \quad \text{Equation (4)}$$

Furthermore, when the equation (4) is converted, the following equation (5) is obtained.

$$\frac{H}{H_m} - (SH_m^2)\left(\frac{H}{H_m}\right)^3 = 1 \quad \text{Equation (5)}$$

When the above equation (5) is modified by using the following equations (6) and (7), the following equation (8) is obtained.

$$X = \frac{H}{H_m} \quad \text{Equation (6)}$$

$$Y = SH_m^2 \quad \text{Equation (7)}$$

$$X - YX^3 = 1, \text{ that is } Y = \frac{X-1}{X^3} \quad \text{Equation (8)}$$

In the equation (8), the maximum value of Y in the case of X>0 is the maximum pressure gradient point at the time of forming the stable film. At the maximum pressure gradient point, the state of dY/dX=0 is achieved, so that X=3/2 and Y=4/27 are obtained. At the maximum pressure gradient point, the above nondimensional variable S is "1". Thus, when Y=4/27 and S=1 are applied to the above equation (7), Hm is obtained by the equation (9) as follows.

$$H_m = \sqrt{\frac{4}{27}} \quad \text{Equation (9)}$$

The thickness hm of the water film at the location of the maximum pressing pressure is defined in view of Hm at the equation (4) through the equation (10) as follows.

$$h_m = \sqrt{\frac{8}{9} \cdot \frac{\eta \cdot U}{\left(\frac{dP}{dx}\right)_{max}}} \quad \text{Equation (10)}$$

When dP/dx is solved, the following equation (11) is obtained.

$$\left(\frac{dP}{dx}\right)_{max} = \frac{8}{9} \cdot \frac{\eta \cdot U}{h_m^2} \quad \text{Equation (11)}$$

where $$\left(\frac{dP}{dx}\right)_{max}$$

denotes the maximum pressure gradient value;
"$h_m$" denotes the thickness of the water film (liquid film) at the location of the maximum pressing pressure of the contacting portion;
"$\eta$" denotes the coefficient of viscosity of the water (liquid); and
"U" denotes the moving speed (wiping speed) of the wiper strip.

That is, it is found that the maximum pressure gradient value (dP/dx)max in the profile of the pressing pressure P and the thickness hm of the water film at the location of the maximum pressing pressure are correlated with each other (in this case, the maximum pressure gradient value (dP/dx)max is a positive value). In other words, when the thickness hm of the water film needs to be within an appropriate range, the maximum pressure gradient value (dP/dx)max may be adjusted to make it possible. The thickness hx of the water film right after the wiping becomes slightly smaller than the thickness hm of the water film at the location of the maximum pressing pressure. In any case, the thickness hx of the water film right after the wiping is on the smaller side where the thickness hx is smaller than the thickness hm, i.e., on the side where the wiping performance is improved. Therefore, in the present embodiment, the thickness hm of the water film at the location of the maximum pressing pressure substitutes for the thickness hx of the water film right after the wiping.

Then, the maximum pressure gradient value (dP/dx)max is obtained for the following three cases. In the first case, the thickness hx of the water film right after the wiping is set in the first range (0 nm<hx≦425 nm) where both of the factor of the evaporation and the factor of the iridescent color(s) caused by the interference of the light are taken into account. In the second case, the thickness hx of the water film right after the wiping is set in the second range (0 nm<hx≦300 nm) where the factor of the evaporation is mainly taken into account. In the third case, the thickness hx of the water film right after the wiping is set in the third range (0 nm<hx≦125 nm) where the factor of the iridescent color(s) caused by the interference of the light is mainly taken into account. The coefficient η of viscosity used in this instance is set to be η=0.00179 Pa·s, which is a coefficient of viscosity of the water under the temperature of 0 (zero) degrees Celsius. The moving speed (the wiping speed) U of the wiper strip used in this instance is set to be U=5 m/s, which is the speed of the high speed wiping operation in the case where the moving speed (the wiping speed) U is shiftable between the low speed and the high speed.

Here, it should be noted that the liquid, which is wiped by the wiper strip, is not limited to the rain water. For example, a commercial washer fluid and an oil film removing fluid are also wiped by the wiper strip besides the rain water. Among these liquids, each of the washer fluid and the oil film removing fluid is formed as a mixture liquid, in which alcohol is mixed, so that the coefficient of viscosity of such a liquid is relatively low, and thereby such a liquid can be advantageously used to form the appropriate liquid film at the time of wiping with the wiper strip 15. In contrast, the water has the higher coefficient of viscosity in comparison to the washer fluid and the oil film removing fluid, so that the water is not advantageous for use with the wiper strip in comparison to the washer fluid and the oil removing fluid. Therefore, in order to form the appropriate water film, which enables the good wiping performance of the wiper strip 15, the coefficient of the water is desirably set equal to or higher than the coefficient of viscosity of the water under the temperature of 0 degree Celsius right before freezing, i.e., the coefficient of viscosity of the worst conditioned water. In this way, even when the water is used as a washer fluid instead of the mixture liquid (e.g., the commercial washer fluid and the oil removing fluid), the wiping operation of the wiper strip 15 can form the appropriate water film, which enables the good wiping performance.

Furthermore, the moving speed of the wiper strip 15 on the glass surface 1a is desirably set in a range of 0.1 m/s to 5 m/s. Specifically, when the moving speed of the wiper strip 15 becomes lower than 0.1 m/s, the water film between the wiper strip 15 and the glass surface 1a is shifted from a liquid lubricant state toward a solid lubricant state. Thus, wearing of the wiper strip 15 is disadvantageously promoted. Furthermore, when the shift toward the solid lubricant state occurs, the friction of the wiper strip 15 is increased to generate chattering vibrations of the wiper strip 15. In contrast, when the moving speed of the wiper strip 15 becomes higher than 5 m/s, a possibility of having an overrun of the wiper blade beyond a predetermined return position in the reciprocal wiping path of the wiper blade is increased. Thus, in order to avoid the overrun, the wiping pattern (wiping range) needs to be set smaller. For example, when each of the low speed wiping operation mode and the high speed wiping operation mode is set in the moving speed in the above range of higher than 5 m/s, the wiping range in the low speed wiping operation mode is disadvantageously reduced although there is a relatively low possibility of having the overrun in the low speed wiping operation mode. Therefore, it is desirable to set the moving speed of the wiper strip 15 in the range of 0.1 m/s to 5 m/s.

In the case where the thickness hx of the water film right after the wiping is set in the first range (0 nm<hx≦425 nm) described above, the maximum pressure gradient value (dP/dx)max becomes as follows: (dP/dx)max≧44.1 MPa/mm. In the case where the thickness hx of the water film right after the wiping is set in the second range (0 nm<hx≦300 nm), the maximum pressure gradient value (dP/dx)max becomes as follows: (dP/dx)max≧88.5 MPa/mm. In the case where the thickness hx of the water film right after the wiping is set in the third range (0 nm<hx≦125 nm), the maximum pressure gradient value (dP/dx)max becomes as follows: (dP/dx)max≧509.7 MPa/mm. The coefficient η of viscosity of the water and the moving speed (the wiping speed) U of the wiper strip are not limited to the above values and may be modified in an appropriate manner to compute the corresponding maximum pressure gradient value (dP/dx)max.

The maximum pressure gradient value (dP/dx)max can be adjusted by modifying each corresponding design factor, such as the shape of the wiping portion 23 of the wiper strip 15, particularly the shape of the lip portion 24 (e.g., the shape of the corner, a surface roughness of the surface of the lip portion 24), the material of the wiper strip 15, the pressing pressure applied to the wiper strip 15, and so on. Therefore, the design factors of the wiper strip 15 may be determined to achieve the maximum pressure gradient value (dP/dx)max, which makes the thickness hx of the water film right after the wiping to the desired thickness. Thereby, according to the present embodiment, it is possible to form the wiper strip 15, which achieves the high wiping performance in the reliable way. That is, the thickness hx of the water film, which is formed right after the wiping, can be controlled by setting the maximum pressure gradient value (dP/dx)max in the profile of the pressing pressure P at the contacting portion 24a of the wiper strip 15, which contacts the glass surface 1a.

In the wiper strip 15 of the present embodiment, a subject area of the wiper strip 15, in which the maximum pressure gradient value (dP/dx)max obtained through the above calculation is reflected, is set to be a predetermined longitudinal area A1 (see FIG. 2) that is one half (½) of an entire longitudinal extent of the wiper strip 15, which includes a longitudinal center area of the wiper strip 15. The area A1 of the wiper strip 15 is preferably set to correspond with an important wiping range, which is important in terms of providing a clear view to the driver. More specifically, the area A1 of the wiper strip 15 is preferably set to correspond with an arcuate strip-like center area A0, which is radially centered in the wiping range of the wiper strip 15, as shown in FIG. 1. In this case, the area of the wiper strip 15, in which the maximum pressure gradient value (dP/dx)max is reflected, may be set in accordance with the U.S. regulation, i.e., the Federal Motor Vehicle Safety Standards (FMVSS) No. 104, which specifies requirements for windshield wiping and washing systems (particularly related to the wiped view).

Next, advantages of the above embodiment will be described.

(1) The above relationship between the thickness hm of the water film at the location of the maximum pressing pressure and the maximum pressure gradient value (dp/dx)max is deduced, and each corresponding design factor of the wiper strip 15 is determined based on the above relationship. Here, the thickness hx of the water film right after the wiping has the influence on the view of the driver, so that the thickness hx of the water film right after the wiping is set to fall within the appropriate range to provide the appropriate view to the driver. The thickness hx of the water film right after the wiping directly relates to the thickness hm of the water film at the location of the maximum pressing pressure. Therefore, the maximum pressure gradient value (dP/dx)max is determined such that the thickness hm of the water film at the location of the maximum pressing pressure, which serves as the thickness hx of the water film right after the wiping, falls in the above appropriate range. Then, each corresponding design factor of the wiper strip 15 is determined to implement the determined maximum pressure gradient value (dP/dx)max. In the wiper strip 15, which is formed based on this, the thickness hx of the water film right after the wiping falls in the appropriate range. Thus, it is possible to improve the wiping performance in the reliably manner. Thereby, it is possible to reduce the required designing time.

(2) Each corresponding design factor of the wiper strip 15 is determined based on the corresponding maximum pressure gradient value (dP/dx)max, which makes the thickness hx of the water film right after the wiping, i.e., the thickness hm of the water film at the location of the maximum pressing pressure in the present embodiment to fall in the corresponding one of the first range (0 nm<hx≦425 nm), the second range (0 nm<hx≦300 nm) and the third range (0 nm<hx≦125 nm). Each of the above ranges of the thickness of the water film is the appropriate range, which is measured upon setting of the condition to provide the clear view to the driver with reference to the JIS D5710. Thus, when each corresponding design factor of the wiper strip is determined using the above corresponding range, the wiping performance can be more reliably improved.

In the case where the coefficient of viscosity (η=0.001792 Pa·s) of the water under the water temperature of zero degrees Celsius and the high moving speed (U=5 m/s) of the wiper strip for implementing the high speed wiping operation are used, the maximum pressure gradient value (dP/dx)max should be equal to or larger than 44.1 MPa/mm in order to place the thickness hx of the water film right after the wiping within the first range. Also, the maximum pressure gradient value (dP/dx)max should be equal to or larger than 88.5 MPa/mm in order to place the thickness hx of the water film right after the wiping within the second range. Furthermore, the maximum pressure gradient value (dP/dx)max should be equal to or larger than 509.7 MPa/mm in order to place the thickness hx of the water film right after the wiping within the third range. When the wiper strip 15 is formed based on the above data, the thickness hx of the water film right after the wiping falls in the appropriate range, so that the wiping performance can be reliably improved.

(3) The predetermined longitudinal area (the area A1 that is one half, i.e., ½ of the entire longitudinal extent of the wiper strip 15 in the present embodiment), which includes the longitudinal center area of the wiper strip 15, is set as the subject area, to which the above designing method is applied. The longitudinal center area of the wiper strip 15 is the important area for providing the clear view to the driver after the wiping. Therefore, when the designing method of the present embodiment is applied to the longitudinal center area of the wiper strip 15, the required wiping performance can be maintained at least in this important area.

The above embodiment of the present invention may be modified as follows.

In the present embodiment, the predetermined longitudinal area of the wiper strip 15 (the area A1 that is one half, i.e., ½ of the entire longitudinal extent of the wiper strip 15 in the present embodiment), which includes the longitudinal center area of the wiper strip 15, is made as the subject area, in which the designing method of the above embodiment is applied. However, the present invention is not limited to this. For example, the entire longitudinal extent of the wiper strip 15 may be made as the subject area, in which the designing method of the above embodiment is applied. With this modification, the wiping performance of the wiper strip 15 can be improved along the entire longitudinal extent of the wiper strip 15.

In the above embodiment, the thickness hm of the water film at the location of the maximum pressing pressure is directly related to the thickness hx of the water film right after the wiping. Thus, the appropriate range(s) of the thickness hx of the water right after the wiping is directly applied to the thickness hm of the water film at the maximum pressing pressure. Alternatively, an appropriate coefficient may be multiplied to the corresponding appropriate range of the thickness hx of the water film right after the wiping to obtain the corresponding thickness hm of the water film at the location of the maximum pressing pressure. Furthermore, the thickness hx of the water film right after the wiping can be computed based on the thickness hm of the water film at the location of the maximum pressing pressure using, for example, the above equations. Therefore, it is possible to obtain the corresponding thickness hm of the water film at the location of the maximum pressing pressure.

In the above embodiment, the wiper strip 15 is held by the lever member 14, which includes the multiple levers 14a-14c, to form the wiper blade 13. However, the present invention is not limited to this. For example, the present invention is applicable to a single lever type wiper blade, which has a single lever. Also, the present invention is applicable to a leverless type wiper blade, from which a lever that has a function of holding the wiper strip through the lever is eliminated.

In the above embodiment, the present invention is applied to the design of the wiper strip 15. Besides the wiper strip 15, the present invention is application to the design of the wiper blade 13.

Additional advantages and modifications will readily occur to those skilled in the art. The invention in its broader terms is therefore not limited to the specific details, representative apparatus, and illustrative examples shown and described.

What is claimed is:

1. A designing method of a wiper strip, the wiper strip including a contacting portion adapted to engage a wiping surface through a liquid film, the designing method comprising:

selecting a maximum thickness of the liquid film ($h_m$) equal to or smaller than 425 nm, the maximum thickness of the liquid film is formed at a corresponding location of the contacting portion of the wiper strip, at which a maximum pressing pressure is developed in a pressing pressure profile of the contacting portion at time of wiping the wiping surface with the wiper strip, wherein the pressing pressure profile is taken in an imaginary plane that is perpendicular to a longitudinal direction of the wiper strip;

obtaining a maximum pressure gradient value in the pressing pressure profile based on the following equation:

$$\left(\frac{dP}{dx}\right)_{max} = \frac{8}{9} \cdot \frac{\eta \cdot U}{h_m^2}$$

where $$\left(\frac{dP}{dx}\right)_{max}$$

denotes the maximum pressure gradient value,
$h_m$ denotes the maximum thickness of the liquid film as defined above,
η denotes the coefficient of viscosity of the liquid, and
U denotes the moving speed of the wiper strip;

setting design factors of the wiper strip based on the maximum pressure gradient value to achieve the maximum pressure gradient value in the pressing pressure profile at the contacting portion of the wiper strip at the time of wiping the wiping surface with the wiper strip, the setting of design factors including at least one of selecting and modifying at least one of a material of the wiper strip, a shape of the contacting portion of the wiper strip, and a size of the contacting portion of the wiper strip; and forming the wiper strip with the set design factors.

2. The designing method according to claim 1, wherein the setting of the maximum thickness of the liquid film includes setting the maximum thickness of the liquid film to a value of 425 nm.

3. The designing method according to claim 1, wherein the setting of the maximum thickness of the liquid film includes setting the maximum thickness of the liquid film to a value of 300 nm.

4. The designing method according to claim 1, wherein the setting of the maximum thickness of the liquid film includes setting the maximum thickness of the liquid film to a value of 125 nm.

5. The designing method according to claim 1, wherein the setting of each corresponding design factor of the wiper strip is applied to a predetermined longitudinal area of the wiper strip, which includes a longitudinal center area of the wiper strip.

6. The designing method according to claim 1, wherein the setting of the moving speed of the wiper strip includes setting the moving speed of the wiper strip in a range of 0.1 m/s to 5 m/s.

7. The designing method according to claim 1, wherein:
the liquid, which is wiped by the wiper strip is water; and
the coefficient of viscosity of the water is set to be equal to or smaller than 0.001792 Pa·s.

8. The designing method according to claim 1, further comprising a step of wiping the wiping surface with the wiper strip.

9. The designing method according to claim 1, further comprising conducting a wiping performance test with the wiper strip.

* * * * *